US012671665B2

(12) United States Patent
Mishra et al.

(10) Patent No.: US 12,671,665 B2
(45) Date of Patent: Jun. 30, 2026

(54) AUTOMATICALLY GENERATING AND TARGETING COMMUNICATIONS USING ARTIFICIAL INTELLIGENCE TECHNIQUES

(71) Applicant: Dell Products L.P., Round Rock, TX (US)

(72) Inventors: Abhishek Mishra, Bangalore (IN); Vivek Bhargava, Bangalore (IN); Piyush Goswami, Bangalore (IN); Ajith Navada, Davangere District (IN)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 18/436,466

(22) Filed: Feb. 8, 2024

(65) Prior Publication Data

US 2025/0260659 A1      Aug. 14, 2025

(51) Int. Cl.
| | |
|---|---|
| *H04L 51/043* | (2022.01) |
| *H04L 41/16* | (2022.01) |
| *H04L 41/5019* | (2022.01) |

(52) U.S. Cl.
CPC ............ *H04L 51/043* (2013.01); *H04L 41/16* (2013.01); *H04L 41/5019* (2013.01)

(58) Field of Classification Search
CPC .... H04L 51/043; H04L 41/16; H04L 41/5019
See application file for complete search history.

(56) References Cited

U.S. PATENT DOCUMENTS

| | | | |
|---|---|---|---|
| 9,317,574 B1 * | 4/2016 | Brisebois | .............. G06F 16/254 |
| 10,278,049 B2 | 4/2019 | Abu-Hakima et al. | |
| 10,380,876 B2 | 8/2019 | Miasnik et al. | |
| 10,382,379 B1 * | 8/2019 | Zhang | .................. G06Q 10/107 |
| 11,153,248 B2 | 10/2021 | Dyor | |
| 2017/0337283 A1 * | 11/2017 | Bliss | ..................... G06F 16/951 |
| 2020/0213236 A1 * | 7/2020 | Safavi | ................... H04L 41/069 |
| 2022/0113988 A1 * | 4/2022 | Swvigaradoss | ..... G06F 3/04842 |
| 2022/0294754 A1 * | 9/2022 | Rozenbaum | .......... H04L 51/216 |
| 2022/0405805 A1 * | 12/2022 | Khoury | .............. G06Q 30/0254 |
| 2023/0117225 A1 * | 4/2023 | Porto Guedes | .... G06Q 10/0633 |
| | | | 705/7.27 |
| 2024/0427879 A1 * | 12/2024 | Bulut | .................... G06F 21/554 |

* cited by examiner

*Primary Examiner* — Glenton B Burgess
(74) *Attorney, Agent, or Firm* — Ryan, Mason & Lewis, LLP

(57) ABSTRACT

Methods, apparatus, and processor-readable storage media for automatically generating and targeting communications using artificial intelligence techniques are provided herein. An example computer-implemented method includes obtaining notification data associated with one or more software applications and/or one or more processing devices; determining at least one issue and one or more actions for resolving at least a portion of the issue(s) by processing at least a portion of the notification data using one or more artificial intelligence techniques; identifying at least one recipient of communication data related to the at least one issue by processing user-related data, across multiple users, in connection with the issue(s) and/or the action(s); generating the communication data including identification of the issue(s) and a recommendation for performing the action(s); and transmitting at least a portion of the communication data to the at least one recipient.

20 Claims, 6 Drawing Sheets

- DEAR USER A,

- THE FOLLOWING APPLICATION HAS HIGH CPU UTILIZATION FOR ORGANIZATION X. PLEASE VISIT OUR HIGH CPU RESOLUTION GUIDE FOR STEPS THAT CAN BE TAKEN.

- ANALYSIS:

- AS PER OUR HISTORICAL DATA ANALYSIS, THIS ISSUE MAY OCCUR BECAUSE OF RECURRING DATABASE FAILURES AND MULTIPLE RETRIES

- AS A NEXT STEP TO RESOLVE THIS ISSUE PLEASE CHECK YOUR APPLICATION LOGS AND CONNECT WITH DATABASE ADMINISTRATOR TEAM.

- FOUNDATION MSC01 (apps.777777701.pcf.enterpriseD.com)

| SPACE | APP | AI INDEX | AVERAGE CPU | METRICS URL CPU |
|---|---|---|---|---|
| EnterpriseD–ProdPC02 | yyyzzz–api–4.0.2.RELEASE–1234567 | 0 | 131.977 | GO TO METRICS |

- DEAR USER B,

- THE FOLLOWING APPLICATION HAS A "STARTED" STATE BUT IS NOT RUNNING IN ORGANIZATION Y. THE APPLICATION IS LABELED AS "DOWN" IN THE APPLICATIONS (APPS) MANAGER. PLEASE VISIT OUR STARTED APPS NOT RUNNING GUIDE FOR STEPS THAT CAN BE TAKEN.

- ALL NON-PRODUCT APPS THAT REMAIN IN THIS STATE AFTER 24 HOURS OF THIS EMAIL GOING OUT WILL BE STOPPED BY THE SUPPORT TEAM. PRODUCT APPS WILL ONLY BE STOPPED AFTER DISCUSSING WITH THE APPLICATION DEVELOPMENT TEAMS.

- APPS ARE STOPPED TO ENSURE OVERALL HEALTH OF THE ENVIRONMENT

- ANALYSIS:

- BASED ON THE APPLICATION LOGS, THE APPLICATION CRASHED BECAUSE OF YESTERDAY'S NEW MODULE DEPLOYMENT.

- KINDLY ROLL BACK YOUR CHANGES AND PERFORM THE REQUIRED CODE FIX.

- FOUNDATION P1 (apps.001.pcf.enterpriseD.com)

| SPACE | APP NAME | APP GUID |
|---|---|---|
| EnterpriseD-ProdPC01 | SERVICES | 1x1x1xx1-xxxx-111x-1111-xx11xx11x11x |

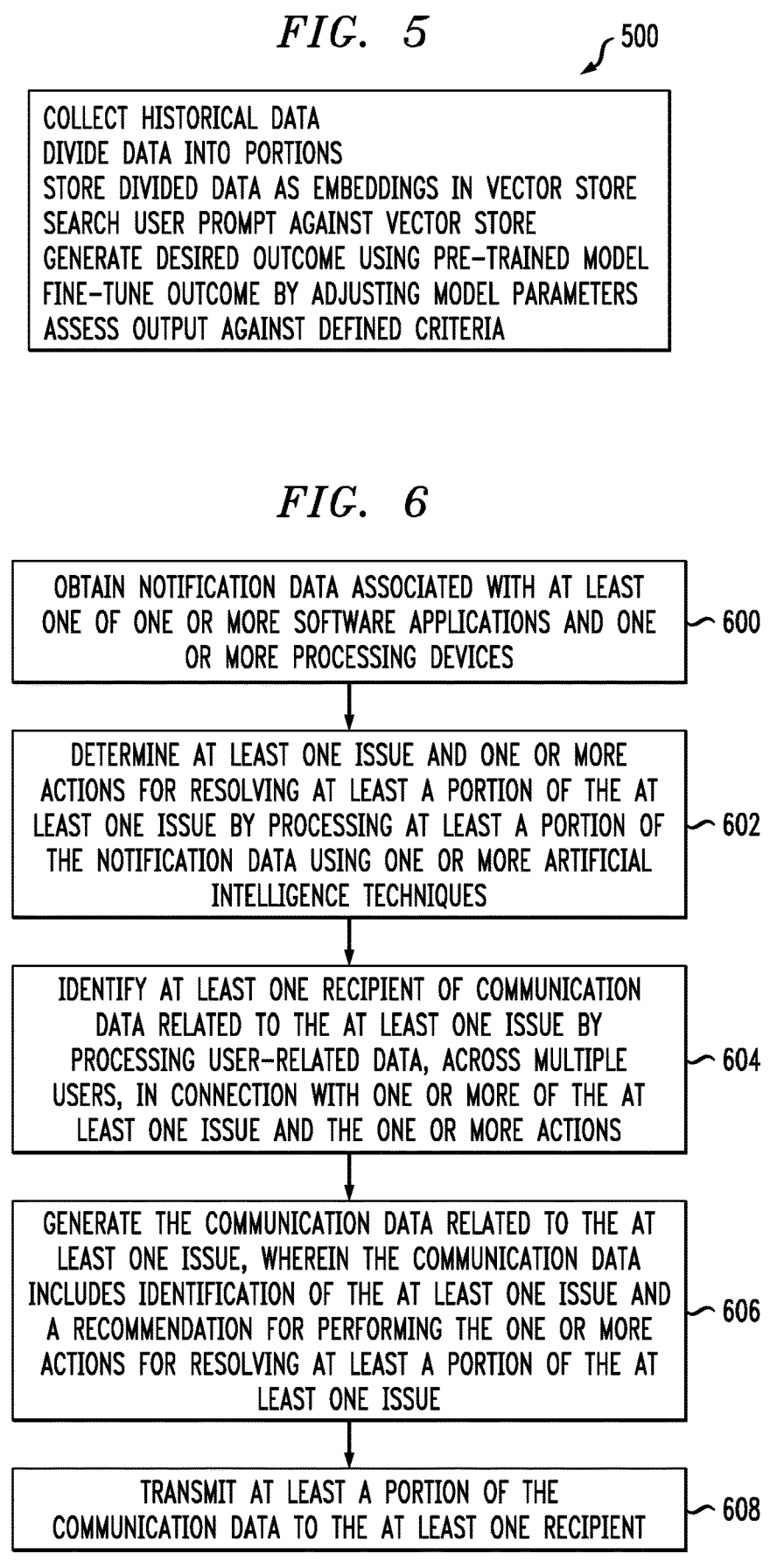

*FIG. 5*                          500

```
COLLECT HISTORICAL DATA
DIVIDE DATA INTO PORTIONS
STORE DIVIDED DATA AS EMBEDDINGS IN VECTOR STORE
SEARCH USER PROMPT AGAINST VECTOR STORE
GENERATE DESIRED OUTCOME USING PRE-TRAINED MODEL
FINE-TUNE OUTCOME BY ADJUSTING MODEL PARAMETERS
ASSESS OUTPUT AGAINST DEFINED CRITERIA
```

*FIG. 6*

OBTAIN NOTIFICATION DATA ASSOCIATED WITH AT LEAST ONE OF ONE OR MORE SOFTWARE APPLICATIONS AND ONE OR MORE PROCESSING DEVICES ⟵ 600

DETERMINE AT LEAST ONE ISSUE AND ONE OR MORE ACTIONS FOR RESOLVING AT LEAST A PORTION OF THE AT LEAST ONE ISSUE BY PROCESSING AT LEAST A PORTION OF THE NOTIFICATION DATA USING ONE OR MORE ARTIFICIAL INTELLIGENCE TECHNIQUES ⟵ 602

IDENTIFY AT LEAST ONE RECIPIENT OF COMMUNICATION DATA RELATED TO THE AT LEAST ONE ISSUE BY PROCESSING USER-RELATED DATA, ACROSS MULTIPLE USERS, IN CONNECTION WITH ONE OR MORE OF THE AT LEAST ONE ISSUE AND THE ONE OR MORE ACTIONS ⟵ 604

GENERATE THE COMMUNICATION DATA RELATED TO THE AT LEAST ONE ISSUE, WHEREIN THE COMMUNICATION DATA INCLUDES IDENTIFICATION OF THE AT LEAST ONE ISSUE AND A RECOMMENDATION FOR PERFORMING THE ONE OR MORE ACTIONS FOR RESOLVING AT LEAST A PORTION OF THE AT LEAST ONE ISSUE ⟵ 606

TRANSMIT AT LEAST A PORTION OF THE COMMUNICATION DATA TO THE AT LEAST ONE RECIPIENT ⟵ 608

AUTOMATICALLY GENERATING AND TARGETING COMMUNICATIONS USING ARTIFICIAL INTELLIGENCE TECHNIQUES

COPYRIGHT NOTICE

BACKGROUND

Commonly, enterprise users and/or other individuals (e.g., employees) receive various types of communications ranging in importance, time sensitivity, format, etc. However, many such communications are often disregarded by users because the communications do not pertain to the specific responsibilities of the given user, the communications lack clarity on the appropriate action to be taken, etc. For example, using conventional communication techniques, messages are broadcast and/or sent to multiple users via one or more distribution lists, and a lack of understanding of identifying a specific message target persists across the recipients. Consequently, many of the recipients frequently ignore such messages, which can lead to impactful delays, errors, and/or resource wastage.

SUMMARY

Illustrative embodiments of the disclosure provide techniques for automatically generating and targeting communications using artificial intelligence techniques.

An exemplary computer-implemented method includes obtaining notification data associated with at least one of one or more software applications and one or more processing devices. The method also includes determining at least one issue and one or more actions for resolving at least a portion of the at least one issue by processing at least a portion of the notification data using one or more artificial intelligence techniques, and identifying at least one recipient of communication data related to the at least one issue by processing user-related data, across multiple users, in connection with one or more of the at least one issue and the one or more actions. Additionally, the method includes generating the communication data related to the at least one issue, wherein the communication data includes identification of the at least one issue and a recommendation for performing the one or more actions for resolving at least a portion of the at least one issue. Further, the method includes transmitting at least a portion of the communication data to the at least one recipient.

Illustrative embodiments can provide significant advantages relative to conventional communication techniques. For example, problems associated with delays, errors, and/or resource wastage arising from unclear and/or overinclusive communications are overcome in one or more embodiments through automatically generating and targeting issue-based communications to specific recipients using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 2 shows an example execution workflow in an illustrative embodiment.

FIG. 3 shows an example message generated in an illustrative embodiment.

FIG. 4 shows an example message generated in an illustrative embodiment.

FIG. 5 shows example pseudocode for implementing one or more artificial intelligence techniques in an illustrative embodiment.

FIG. 6 is a flow diagram of a process for automatically generating and targeting communications using artificial intelligence techniques in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
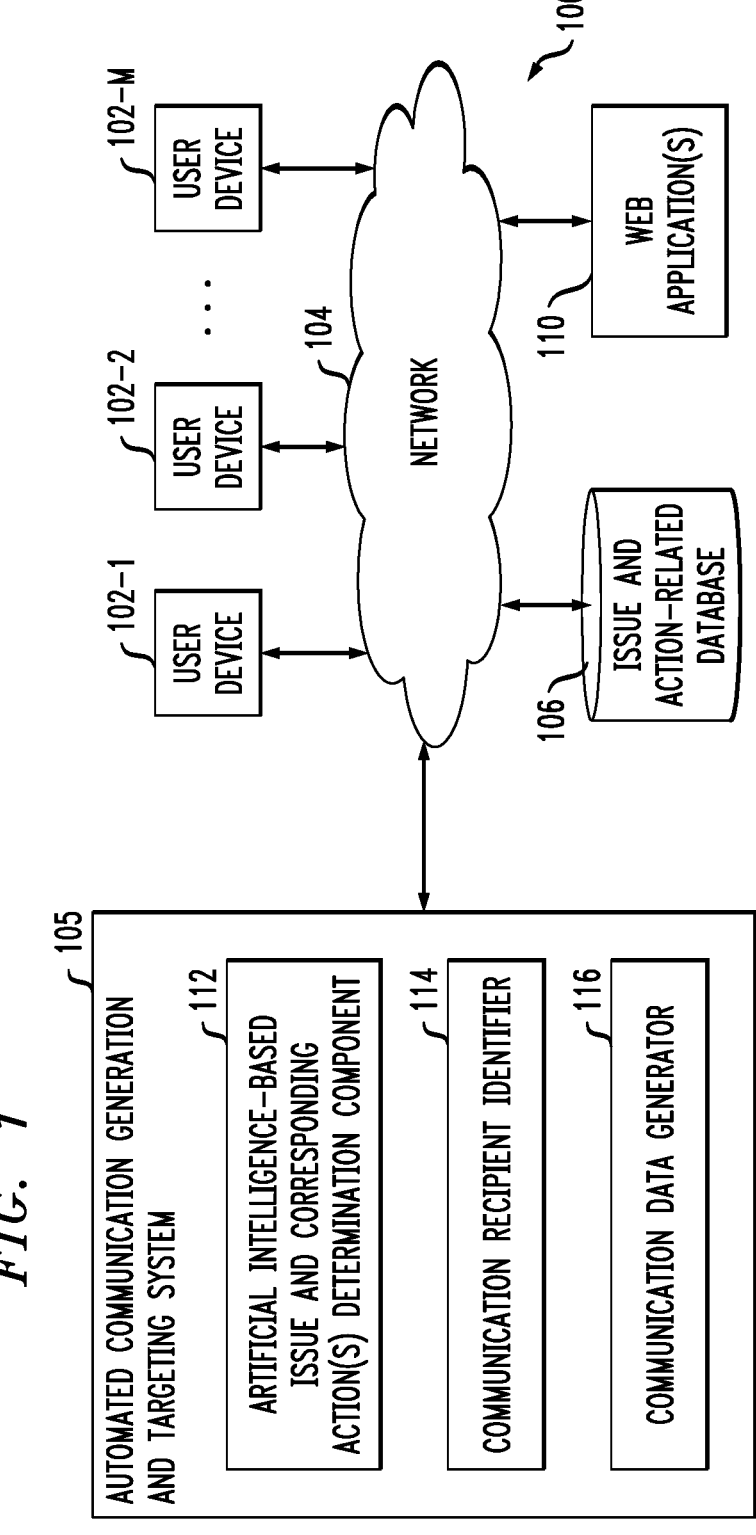
FIG. 1 shows an information processing system configured for automatically generating and targeting communications using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated communication generation and targeting system 105 and one or more web applications 110 (e.g., web-based communication applications, web-based device and/or system monitoring applications, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automated communication generation and targeting system 105 can have an associated issue and action-related database 106 configured to store data pertaining to various issues associated with one or more software applications and/or one or more processing devices and/or systems, various actions requested and/or performed in connection with one or more of the various issues, including user action performance data, temporal-related data, etc.

The issue and action-related database 106 in the present embodiment is implemented using one or more storage systems associated with the automated communication generation and targeting system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automated communication generation and targeting system 105 are one or more input-output devices, which illustratively comprise keyboards, displays or other types of input-output devices in any combination. Such input-output devices can be used, for example, to support one or more user interfaces to the automated communication generation and targeting system 105, as well as to support communication between the automated communication generation and targeting system 105 and other related systems and devices not explicitly shown.

Additionally, the automated communication generation and targeting system 105 in the FIG. 1 embodiment is assumed to be implemented using at least one processing device. Each such processing device generally comprises at least one processor and an associated memory, and implements one or more functional modules for controlling certain features of the automated communication generation and targeting system 105.

More particularly, the automated communication generation and targeting system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automated communication generation and targeting system 105 to communicate over the network 104 with the user devices 102, and illustratively comprises one or more conventional transceivers.

The automated communication generation and targeting system 105 further comprises artificial intelligence-based issue and corresponding action(s) determination component 112, communication recipient identifier 114, and communication data generator 116.

It is to be appreciated that this particular arrangement of elements 112, 114 and 116 illustrated in the automated communication generation and targeting system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically generating and targeting communications using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of automated communication generation and targeting system 105, issue and action-related database 106, and web application(s) 110 can be on and/or part of the same processing platform.

An exemplary process utilizing elements 112, 114 and 116 of an example automated communication generation and targeting system 105 in computer network 100 will be described in more detail with reference to the flow diagram of FIG. 6.

Accordingly, at least one embodiment includes automatically generating and targeting communications using artificial intelligence techniques. For example, as detailed herein, such an embodiment can include converting one or more group messages and/or notifications from one or more broadcasts to one or more actionable messages to one or more specific and/or appropriate points of contact (e.g., a particular user such as a customer, employee, etc.). Accordingly, one or more embodiments can include reducing and/or minimizing the count of less relevant and/or irrelevant communications for one or more users by targeting specific and/or appropriate message recipients, based at least in part on recipient availability, and providing one or more stated next action points.

As further detailed herein, one or more embodiments also include analyzing one or more portions of a communication (e.g., the body of a message or notification) and determining context-related information to assist in identifying one or more specific actions associated with the communication and/or identifying one or more specific recipients (e.g., based at least in part on recipient availability and/or recipient skills or action capabilities) of the communication to target with carrying out the one or more specific actions. Such an embodiment can then include directing or re-directing the communication and/or a modified version thereof (e.g., a version which highlights the one or more specific actions) to the one or more specific recipients.

At least one embodiment can additionally include determining situations wherein a single communication can be utilized to cover multiple similar actions. Such an embodiment can include collecting and/or processing data from various data sources such as, for example, git commits, organizational charts, email applications, development repositories, etc., to learn information about users and/or potential communication recipients with respect to various actions and/or capabilities, availability, positions within a given enterprise, etc.

As further detailed herein, one or more embodiments include modifying a communication (e.g., the body of a notification) by making at least a portion of the communication more generic and actionable by incorporating step-by-step instructions for one or more specific actions. Such an embodiment can include replacing terms of art and/or jargon words with more general and/or understandable terms.

Additionally, such an embodiment includes converting one or more statements (e.g., all statements) in at least a portion of the communication into one or more action-oriented sentences (e.g., one or more sentences starting with verb followed by one or more nouns consistent with user and/or recipient understanding). By way merely of example, for communications pertaining to one or more failed operations, such an embodiment can include determining and/or identifying corresponding recovery steps, and stating such recovery steps in at least one appropriate sequence. Such an embodiment can also include determining at least one service level agreement (SLA) which governs at least a portion of the recovery steps (e.g., identifies temporal parameters for completing one or more of the recovery steps), and incorporating any such information into the communication and/or modified version thereof (e.g., including one or more timeouts, need-by times, and/or other relevant temporal parameters in the sequence of recovery steps to be performed). In connection with such an embodiment, data can be gathered and/or processed from various resources such as, e.g., dictionaries, historical data sources, lookup tables, etc.

At least one embodiment includes implementing at least one trigger mechanism. For example, once a given event occurs (e.g., an outage), an end date to complete one or more corresponding tasks is determined, and the generation of a communication (e.g., an email) is triggered, wherein the communication will include context information pertaining to the given event and one or more actionable inputs related to the one or more corresponding tasks. Such a trigger mechanism can also facilitate and/or lead to the collection and/or processing of relevant data from one or more sources, wherein such data can pertain to potential recipients of the communication, including information related to availability, skills, ownership, application status, deployment date(s), etc. As used herein, ownership refers to the one or more entities which have the authority to take necessary actions for communication in connection with a given application.

Additionally, one or more embodiments include discovering and/or identifying one or more specific recipients for such a communication. Such an embodiment can include obtaining and/or processing user-related data from one or more data sources. By way merely of example, within a software application development context, at least one embodiment can include processing data using a cloud platform application programming interface (API) to identify which user(s) own(s) the space along with application owner details, identify which user(s) deployed the application last and what actions are required along with one or more corresponding timelines. As used in this context, space refers to a group of applications that are organized using a hierarchical structure of business unit (BU)/organization (ORG)/space/application/API, wherein this structure is primarily used for role and access management purposes. Further, such an example embodiment can include processing relevant historical records to determine which users are likely to carry out such required actions (e.g., identifying one or more users who have a historical record of acting on similar requests), and/or which users are associated with the same domain of work as the required actions and/or the given software application development content.

Additionally or alternatively, such an example embodiment can include processing data using an email client API to, e.g., collect records and/or data pertaining to communications involving relevant users (e.g., past meetings, calls, discussions, chats, emails, etc.). Using such data, at least one embodiment can include determining and/or identifying which users are available with respect to carrying out the required actions. Accordingly, such an embodiment can include, based at least in part on such data processing, intelligently creating a dynamic list of one or more recipients who are available at one or more relevant times to perform at least a portion of the required actions. Conventional communication processes can involve sending broadcasts to all users within an organization. However, one or more embodiments can include enhancing such a process by gathering application developers' information and application owner information from historical data in Git check-ins and/or an organizational chart. Such an intelligent approach enables one or more embodiments to restrict communications to a specific and/or focused group, ensuring that the correct and/or appropriate information reaches the intended recipient(s). By leveraging such data, at least one embodiment can include streamlining communication and rendering the communication more targeted, improving efficiency and reducing unnecessary noise for users who are not directly involved.

Such an example embodiment can then include generating and sending a communication to the one or more listed recipients. One or more embodiments can include, for example, utilizing at least one foreground application (e.g., an open email application, an open chat application, etc.) of a given recipient for sending the communication. Such an embodiment can, for example, determine the at least one foreground application of a given user by using one or more APIs associated with one or more relevant applications (e.g., an email client application, a messaging application, etc.).

Additionally, the communication can include a specific request which the recipient(s) can efficiently approve or reject. At least one embodiment can include building and/or training a classifier using historical instances to assist recipients and/or approvers in future voting. Also, if the request is approved by a given recipient, one or more embodiments include initiating a response communication (e.g., email) that the action has been performed, and closing the ticket corresponding thereto.

With respect to the above-noted classifier, at least one embodiment includes collecting historical data on past issues and their resolutions to identify one or more patterns, one or more root causes, and/or one or more potential solutions. Analyzing such data can assist in improving efficiency, preventing recurring issues, and creating at least one knowledge base for reference. By understanding past experiences, one or more embodiments can include expediting issue resolution and enhancing problem-solving capabilities. In at least one example embodiment, the data can be divided into smaller portions and stored as embeddings in a vector store. Pre-trained models such as, e.g., Llama-2-13b-chat or CodeLlama-13b-instruct are then utilized to generate one or more desired outcomes. Such models, in at least one embodiment, are trained on vast amounts of data and can understand and generate natural language text, making them useful for various data-driven tasks such as detailed herein.

Accordingly, one or more embodiments include communication and/or message processing. As detailed above, such an embodiment can include determining and/or generating a dynamic list of recipients who are (more) likely to act in near real-time to approve or reject a request pertaining to carrying out one or more actions. In determining such recipients, at least one embodiment includes processing data pertaining the historical records of various users with respect to acting on similar requests, as well as data pertaining to the subject of the communication (e.g., the users' roles in a software application development operation).

By way of example, in a software application development context, such an embodiment can include using one or more natural language processing (NLP) techniques to extract relevant information from at least one user-submitted free text justification to install the application. Additionally, such an embodiment can include embedding at least a portion of the text justification to at least one vector representation using one or more pre-trained large language models (LLMs). As noted above, the relevant data can be divided into smaller portions and stored as embeddings in a vector store. Such an approach allows for efficient storage and retrieval of data by representing the data as compact numerical representations. More particularly, dividing the data into smaller portions helps in organizing and managing large datasets, making it easier to process and analyze. Further, storing the data as embeddings in a vector store enables faster and more efficient search and retrieval operations, facilitating various data-driven tasks such as, e.g., similarity matching and recommendation systems.

Also, one or more embodiments can include applying a fine-tuning process to the one or more LLMs to gear the embeddings to enterprise-specific and/or task-specific content and context. In such an embodiment, fine-tuning of the result is achieved by making adjustments to one or more model parameters, including, e.g., temperature, top_p, top_k, prompt, etc. Such parameters allow for fine-grained control over the generated output. For example, by adjusting the temperature parameter, the level of randomness in the output can be controlled, with higher values leading to more diverse and creative responses. Also, the top_p and top_k parameters can help in controlling the diversity and specificity of the generated text by setting thresholds for the probability distribution of the next word. Additionally, the prompt parameter can allow for providing specific instructions and/or cues to guide the model's generation process. By fine-tuning at least a portion of such parameters, a desired output can be achieved, ensuring that the generated text aligns with the intended purpose and style.

Further, at least one embodiment can include associating such a text justification with previously completed actions and/or not completed actions based at least in part on processing of historical records.

As also noted above, one or more embodiments include determining which, if any, potential recipients are associated with the same domain of work. Such an embodiment can include processing data such as, for example, user lists of installed software applications, employee metadata (e.g., DevOps data), communication data derived from various user groups and/or teams, etc., to identify people in one or more domains similar to the domain(s) associated with the communication.

Additionally, one or more embodiments include training at least one classifier (e.g., an extreme gradient boosting (XGBoost) classifier) to calculate the probability of a given user/recipient acting on a communication, wherein such training can include utilizing user/recipient metadata and/or past acting history. In such an embodiment, the potential recipients can be ranked based at least in part on the acting probability of each potential recipient, and the communication to be sent to at least one of the top-ranked recipients.

At least one embodiment includes tracking different stages during cycle times of one or more processes. For example, such an example can include collecting data based on actions completed and pending actions from different sources involved in a given process. Tracking such information can be carried out through one or more APIs provided by one or more systems. More particularly, such an embodiment can include monitoring actions and identifying one or more triggers (e.g., whenever an application reaches a CPU or memory utilization of 90% or above, if an application has vulnerabilities, etc.) to expedite the given process. Additionally, potential risk can be determined with respect to users not performing tasks and/or actions on time.

Such tracking can provide a comprehensive view of the work done by one or more users and/or potential communication recipients (e.g., team members within a given portion of an enterprise) and facilitate determining whether each given user and/or potential communication recipient is likely to take one or more specific actions.

Additionally, one or more embodiments include carrying out communication delivery. Such an embodiment includes implementing at least one support API to identify an appropriate communication channel for each of the one or more determined recipients. The communication can be converted into one or more languages (e.g., the native language and/or user-designated preferred language of each recipient) and transmitted to the one or more determined recipients.

Figure 2:
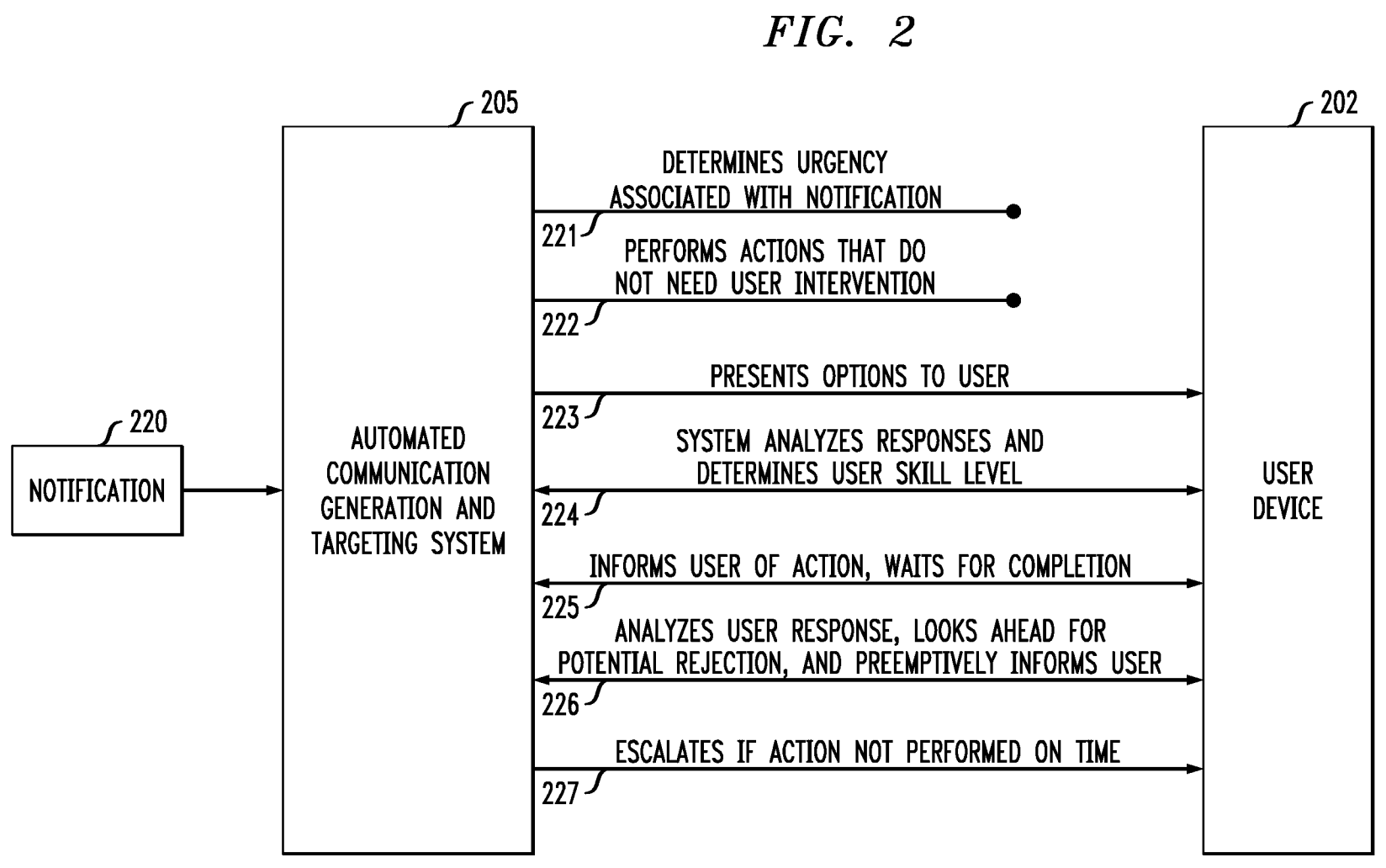

FIG. 2 shows an example execution workflow in an illustrative embodiment. By way of illustration, FIG. 2 depicts an example execution workflow involving a notification 220, automated communication generation and targeting system 205, and user device 202. More particularly, upon receiving and/or processing notification 220, automated communication generation and targeting system 205 determines a level of urgency and/or temporal sensitivity associated with the notification 220 in step 221. Such an urgency determination can be based at least in part on historical data and issue severity, wherein issues can be categorized, e.g., into high, medium, and low urgency levels and/or categories. For instance, if an application has a high vulnerability issue in its recent release and the application is already in production, such issues will be considered as high urgency. By considering the severity and impact of each issue, appropriate urgency levels can be assigned, ensuring that critical issues are prioritized and addressed promptly.

Additionally, in step 222, automated communication generation and targeting system 205 performs one or more actions that do not need and/or require user intervention. Such actions might include, by way merely of example, rolling back the application to a previous stable version, resolving all open issues that are causing the current problem(s), and/or updating legacy and/or vulnerable libraries to ensure security and stability. Further, in step 223, automated communication generation and targeting system 205 presents one or more options (e.g., one or more options related to the notification 220) to the user via user device 202.

In step 224, automated communication generation and targeting system 205 analyzes one or more responses from the user device 202 (in response to the one or more presented options) and determines at least one user skill level associated with the user device 202. Based at least in part on such analysis and determinations, step 225 includes the automated communication generation and targeting system 205 informing the user (via user device 202) of at least one action to be carried out by the user, including given temporal parameters within which to carry out the at least one action, and waits for an indication of completion of the at least one action by the user. Further, in step 226, the automated communication generation and targeting system 205 analyzes at least one user response to the prompt output in step 225, looks ahead for and/or anticipates potential rejection of the user's action(s), and preemptively informs the user (via user device 202). Additionally, in step 227, automated communication generation and targeting system 205 escalates its communication with the user (via user device 202) if the at least one action is not performed by the user within the given temporal parameters. Example escalations might include, e.g., contacting the user's manager(s) for follow-up, and, in the second reminder, escalating the issue to one or more superiors and emphasizing the potential risks to the organization if appropriate actions are not taken within the specified time frame.

As detailed herein, one or more embodiments include modifying and/or genericizing unambiguous technical terms such that such terms can be understood and/or processed by one or more artificial intelligence-based communication targeting systems. For example, such an embodiment can include converting messages into easily readable and actionable messages. The message processing of one or more embodiments determines and incorporates the urgency and action needs by computing need-by-times as part of the message. Additionally, at least one embodiment can include using one or more dictionaries to tag one or more portions of the message, wherein such tags can simplify the post-processing of the message content for the recipients.

Further, as noted herein, one or more embodiments include intelligently classifying one or more users and/or potential communication recipients based at least in part on likeliness and/or probability of acting on the communication. Such an embodiment can also include determining and utilizing recipient foreground applications for sending the communication(s) in approximately real-time. Additionally, at least one embodiment includes leveraging existing message catalog data (e.g., historical data transformed into vector representations, which were then used as inputs for at least one LLM) in connection with generating and/or transmitting communications.

FIG. 3 shows an example message 300 generated in an illustrative embodiment. In contrast to conventional approaches, which generate a non-specific message to a group of multiple users and include merely a broad statement that an issue requiring attention exists, one or more embodiments can include automatically generating and transmitting example message 300 to a specific user (e.g., User A) with granular technical information. More particularly, example message 300 identifies a specific application as having high central processing unit (CPU) utilization for a specific organization (i.e., Organization X). Example message 300 further provides a link to a corresponding resolution guide for relevant steps that can be taken by User A, and also provides analysis associated with one or more artificial intelligence-based processing of the issue (e.g., using Llama-2-13b-chat and/or CodeLlama-13b-instruct). Specifically, example message 300 indicates that this high CPU utilization issue may occur because of recuring database failures and multiple retries. Example message 300 additionally includes a recommendation for resolving the issue, which in this instance, includes checking application logs and connecting with a database administrator.

FIG. 4 shows an example message 400 generated in an illustrative embodiment. In contrast to conventional approaches, which generate a non-specific message to a group of multiple users and include merely a broad statement that an issue requiring attention exists, one or more embodiments can include automatically generating and transmitting example message 400 to a specific user (e.g., User B) with granular technical information. More particularly, example message 400 identifies a specific application as having a "Started" state, but is not running in Organization Y and labeled as "Down" in the Applications Manager. Example message 400 further provides a link to a corresponding resolution guide for relevant steps that can be taken by User B, and also provides analysis associated with one or more artificial intelligence-based processing of the issue (e.g., using Llama-2-13b-chat and/or CodeLlama-13b-instruct). Specifically, example message 400 indicates that, based on analysis of the application logs, the application crashed as a result of a new module deployment carried out the day prior. Example message 400 additionally includes a recommendation for resolving the issue, which in this instance, includes rolling back the relevant changes and subsequently performing the required code fix before redeployment of the new module.

FIG. 5 shows example pseudocode for implementing one or more artificial intelligence techniques in an illustrative embodiment. In this embodiment, example pseudocode 500 is executed by or under the control of at least one processing system and/or device. For example, the example pseudocode 500 may be viewed as comprising a portion of a software implementation of at least part of automated communication generation and targeting system 105 of the FIG. 1 embodiment.

The example pseudocode 500 illustrates collecting historical data from various sources, including, for example, one or more enterprise knowledgebases, one or more Git repositories, one or more Pivotal Cloud Foundry (PCF) logs, one or more organizational charts, etc. Example pseudocode 500 also illustrates dividing the collected data into portions and storing the portions as embeddings in at least one vector store. Additionally, based on a user's prompt, a vector search is conducted on the at least one vector store to determine and/or identify the most relevant (to the user's prompt) portions and/or embeddings. Example pseudocode 500 also illustrates utilizing one or more pre-trained models (such as, for example, Llama-2-13b-chat and/or CodeLlama-13b-in-struct) to process the determined and/or identified relevant data portions and/or embeddings and generate the desired outcome. Also, example pseudocode 500 illustrates fine-tuning the result/outcome by adjusting one or more model parameters (e.g., temperature, top_p, top_k, prompt, etc.), and assessing the ultimate output of the model against one or more items of defined criteria (e.g., relevance of information, coherence, overall quality of the response, etc.).

It is to be appreciated that this particular example pseudo-code shows just one example implementation of one or more artificial intelligence techniques, and alternative implementations can be used in other embodiments.

FIG. 6 is a flow diagram of a process for automatically generating and targeting communications using artificial intelligence techniques in an illustrative embodiment. It is to be understood that this particular process is only an example, and additional or alternative processes can be carried out in other embodiments.

In this embodiment, the process includes steps 600 through 608. These steps are assumed to be performed by the automated communication generation and targeting system 105 utilizing elements 112, 114 and 116.

Step 600 includes obtaining notification data associated with at least one of one or more software applications and one or more processing devices.

Step 602 includes determining at least one issue and one or more actions for resolving at least a portion of the at least one issue by processing at least a portion of the notification data using one or more artificial intelligence techniques. In at least one embodiment, determining at least one issue and one or more actions for resolving at least a portion of the at least one issue includes determining one or more temporal constraints applicable to carrying out at least a portion of the one or more actions by processing service level agreement data associated with at least one of the one or more software applications and the one or more processing devices. Additionally or alternatively, determining at least one issue and one or more actions for resolving at least a portion of the at least one issue can include processing the at least a portion of the notification data using one or more NLP techniques and/or processing the at least a portion of the notification data using one or more LLMs.

Step 604 includes identifying at least one recipient of communication data related to the at least one issue by processing user-related data, across multiple users, in connection with one or more of the at least one issue and the one or more actions. In one or more embodiments, identifying at least one recipient comprises processing availability-related data associated with at least a portion of the multiple users. Additionally or alternatively, identifying at least one recipient can include identifying one or more of the multiple users who have previously performed at least a portion of the one or more actions by processing historical records associated with at least a portion of the multiple users, and/or identifying one or more of the multiple users associated with a domain of work related to the one or more actions.

Step 606 includes generating the communication data related to the at least one issue, wherein the communication data comprises identification of the at least one issue and a recommendation for performing the one or more actions for resolving at least a portion of the at least one issue. In at least one embodiment, generating the communication data includes generating the recommendation for performing the one or more actions in a given sequence. Additionally or alternatively, generating the communication data can include generating at least one request for the at least one recipient to approve or reject with respect to performing the one or more actions. Such an embodiment can also include training at least one artificial intelligence-based classifier (e.g., an XGBoost classifier) to calculate a probability of a given recipient approving a given request using feedback from the at least one recipient in response to the at least one request. Further, in such an embodiment, identifying at least one recipient can include ranking at least a portion of the multiple users based at least in part on probability values generated using the at least one artificial intelligence-based classifier.

Step 608 includes transmitting at least a portion of the communication data to the at least one recipient. In one or more embodiments, transmitting at least a portion of the communication data to the at least one recipient includes using at least one foreground application in use on a user device associated with the at least one recipient.

In at least one embodiment, the techniques depicted in FIG. 6 can also include performing one or more automated actions based at least in part on feedback related to transmitting the at least a portion of the communication data to the at least one recipient. In such an embodiment, performing one or more automated actions can include automatically training at least a portion of the one or more artificial intelligence techniques using at least a portion of the feedback related to transmitting the at least a portion of the communication data to the at least one recipient.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate and target and/or assign communications using artificial intelligence techniques. These and other embodiments can effectively overcome problems associated with delays, errors, and/or resource wastage arising from unclear and/or overinclusive communications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figures 7, 8:
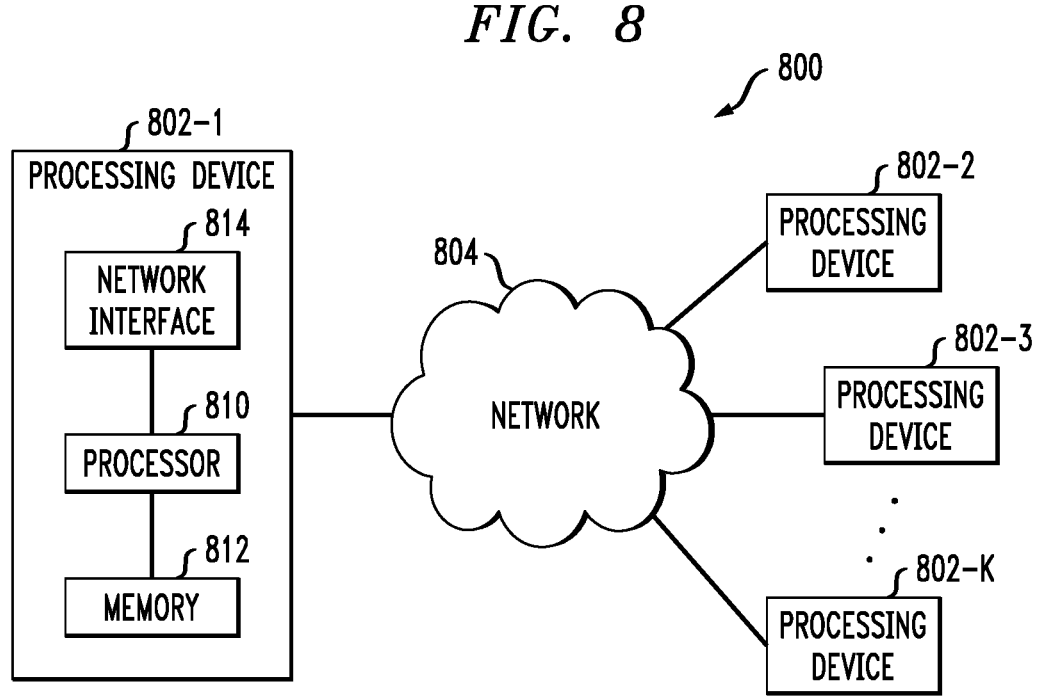
FIGS. 7 and 8 show examples of processing platforms that may be utilized to implement at least a portion of an information processing system in illustrative embodiments.

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more information processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a CPU, a GPU, a TPU, a microcontroller, an ASIC, a FPGA or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining notification data associated with at least one of one or more software applications and one or more processing devices;

determining at least one issue and one or more actions for resolving at least a portion of the at least one issue by processing at least a portion of the notification data using one or more large language models (LLMs), wherein determining at least one issue and one or more actions for resolving at least a portion of the at least one issue comprises determining one or more temporal constraints applicable to carrying out at least a portion of the one or more actions by processing, at least in part in the one or more LLMs, service level agreement data associated with at least one of the one or more software applications and the one or more processing devices;

identifying at least one recipient of communication data related to the at least one issue by processing user-related data, across multiple users, in connection with one or more of the at least one issue and the one or more actions;

generating the communication data related to the at least one issue, wherein the communication data comprises identification of the at least one issue and a recommendation for performing the one or more actions for resolving at least a portion of the at least one issue, wherein the recommendation includes identification of at least one of the one or more temporal constraints applicable to carrying out the at least a portion of the one or more actions; and transmitting at least a portion of the communication data to the at least one recipient;

wherein the method is performed by at least one processing device comprising a processor coupled to a memory.

2. The computer-implemented method of claim 1, wherein determining at least one issue and one or more actions for resolving at least a portion of the at least one issue comprises processing the at least a portion of the notification data using one or more natural language processing (NLP) techniques.

3. The computer-implemented method of claim 1, wherein identifying at least one recipient comprises processing availability-related data associated with at least a portion of the multiple users.

4. The computer-implemented method of claim 1, wherein identifying at least one recipient comprises identifying one or more of the multiple users who have previously performed at least a portion of the one or more actions by processing historical records associated with at least a portion of the multiple users.

5. The computer-implemented method of claim 1, wherein identifying at least one recipient comprises identifying one or more of the multiple users associated with a domain of work related to the one or more actions.

6. The computer-implemented method of claim 1, wherein generating the communication data comprises generating the recommendation for performing the one or more actions in a given sequence.

7. The computer-implemented method of claim 1, wherein transmitting at least a portion of the communication data to the at least one recipient comprises using at least one foreground application in use on a user device associated with the at least one recipient.

8. The computer-implemented method of claim 1, further comprising:

performing one or more automated actions based at least in part on feedback related to transmitting the at least a portion of the communication data to the at least one recipient.

9. The computer-implemented method of claim 8, wherein performing one or more automated actions comprises automatically training at least a portion of the one or more LLMs using at least a portion of the feedback related to transmitting the at least a portion of the communication data to the at least one recipient.

10. The computer-implemented method of claim 1, wherein generating the communication data comprises generating at least one request for the at least one recipient to approve or reject with respect to performing the one or more actions.

11. The computer-implemented method of claim 10, further comprising:

training at least one artificial intelligence-based classifier to calculate a probability of a given recipient approving a given request using feedback from the at least one recipient in response to the at least one request.

12. The computer-implemented method of claim 11, wherein identifying at least one recipient comprises ranking at least a portion of the multiple users based at least in part on probability values generated using the at least one artificial intelligence-based classifier.

13. A non-transitory processor-readable storage medium having stored therein program code of one or more software programs, wherein the program code when executed by at least one processing device causes the at least one processing device:

to obtain notification data associated with at least one of one or more software applications and one or more processing devices;

to determine at least one issue and one or more actions for resolving at least a portion of the at least one issue by processing at least a portion of the notification data using one or more large language models (LLMs), wherein determining at least one issue and one or more actions for resolving at least a portion of the at least one issue comprises determining one or more temporal constraints applicable to carrying out at least a portion of the one or more actions by processing, at least in part in the one or more LLMs, service level agreement data associated with at least one of the one or more software applications and the one or more processing devices;

to identify at least one recipient of communication data related to the at least one issue by processing user-related data, across multiple users, in connection with one or more of the at least one issue and the one or more actions;

to generate the communication data related to the at least one issue, wherein the communication data comprises identification of the at least one issue and a recommendation for performing the one or more actions for resolving at least a portion of the at least one issue, wherein the recommendation includes identification of at least one of the one or more temporal constraints applicable to carrying out the at least a portion of the one or more actions; and to transmit at least a portion of the communication data to the at least one recipient.

14. The non-transitory processor-readable storage medium of claim 13, wherein determining at least one issue and one or more actions for resolving at least a portion of the at least one issue comprises processing the at least a portion of the notification data using one or more NLP techniques.

15. The non-transitory processor-readable storage medium of claim 13, wherein generating the communication data comprises generating the recommendation for performing the one or more actions in a given sequence.

16. The non-transitory processor-readable storage medium of claim 13, wherein transmitting at least a portion of the communication data to the at least one recipient comprises using at least one foreground application in use on a user device associated with the at least one recipient.

17. An apparatus comprising:

at least one processing device comprising a processor coupled to a memory;

the at least one processing device being configured:

to obtain notification data associated with at least one of one or more software applications and one or more processing devices;

to determine at least one issue and one or more actions for resolving at least a portion of the at least one issue by processing at least a portion of the notification data using one or more large language models (LLMs), wherein determining at least one issue and one or more actions for resolving at least a portion of the at least one issue comprises determining one or more temporal constraints applicable to carrying out at least a portion of the one or more actions by processing, at least in part in the one or more LLMs, service level agreement data associated with at least one of the one or more software applications and the one or more processing devices;

to identify at least one recipient of communication data related to the at least one issue by processing user-related data, across multiple users, in connection with one or more of the at least one issue and the one or more actions;

to generate the communication data related to the at least one issue, wherein the communication data comprises identification of the at least one issue and a recommendation for performing the one or more actions for resolving at least a portion of the at least one issue, wherein the recommendation includes identification of at least one of the one or more temporal constraints applicable to carrying out the at least a portion of the one or more actions; and to transmit at least a portion of the communication data to the at least one recipient.

18. The apparatus of claim 17, wherein determining at least one issue and one or more actions for resolving at least a portion of the at least one issue comprises processing the at least a portion of the notification data using one or more NLP techniques.

19. The apparatus of claim 17, wherein generating the communication data comprises generating the recommendation for performing the one or more actions in a given sequence.

20. The apparatus of claim 17, wherein transmitting at least a portion of the communication data to the at least one recipient comprises using at least one foreground application in use on a user device associated with the at least one recipient.

* * * * *